United States Patent [19]

Bruce et al.

[11] Patent Number: 5,250,096
[45] Date of Patent: Oct. 5, 1993

[54] SOL-GEL METHOD OF MAKING MULTICOMPONENT GLASS

[75] Inventors: Allan J. Bruce, Westfield; Eliezer M. Rabinovich, Berkeley Heights, both of N.J.

[73] Assignee: AT&T Bell Laboratories, Murray Hill, N.J.

[21] Appl. No.: 864,989

[22] Filed: Apr. 7, 1992

[51] Int. Cl.$^5$ ............................................. C03B 37/01
[52] U.S. Cl. ...................................... 65/3.11; 65/18.1; 65/18.4; 65/901; 423/338; 501/12
[58] Field of Search ............... 65/900, 901, 18.1, 18.4, 65/3.11, 3.12; 501/12, 54, 55; 423/338

[56] References Cited

U.S. PATENT DOCUMENTS

| | | | |
|---|---|---|---|
| 4,419,115 | 12/1983 | Johnson | 65/18.1 |
| 4,605,428 | 8/1986 | Johnson, Jr. et al. | 65/2 |
| 4,666,247 | 5/1987 | MacChesney et al. | 350/96.34 |
| 4,680,046 | 7/1987 | Matsuo | 65/901 |
| 4,681,615 | 7/1987 | Toki | 501/12 |
| 4,826,288 | 5/1989 | Mansfield | 65/3.12 |
| 5,112,676 | 5/1992 | Cot | 427/126.2 |
| 5,151,117 | 9/1992 | Bartholomew | 65/3.12 |

FOREIGN PATENT DOCUMENTS 2165234  4/1986  United Kingdom ................ 501/12

OTHER PUBLICATIONS

"Review Preparation of Glass by Sintering", by E. M. Rabinovich, Journal of Materials Science, vol. 20, 1985, pp. 4259-4280.
"Sol-Gel Technology of Thin Films, Fibers, Preforms, Electronics and Specialty Shapes", by I. M. Thomas, L. C. Klein, editor, Noyes Publications, pp. 1-15.
"Sol-Gel Technology of Thin Films, Fibers, Preforms, Electronics, and Specialty Shapes", by E. M. Rabinovich, L. C. Klein, editor, Noyes Publications, 1988, pp. 260-294.
"Equilibrium Compressibilities and Density Fluctuations in $K_2O-SiO_2$ Glasses", by N. L. Laberge et al., Journal of the American Ceramic Society, vol. 56(1), p. 506.
"Rayleigh and Brillouin Scattering in $K_2O-SiO_2$ Glasses", by J. Schroeder et al., Journal of the American Ceramic Society, vol. 56(10), pp. 510-514.
A. G. Mateos et al., 93rd Annual Meeting Abstracts, American Ceramic Society, Cincinnati, Ohio, Apr. 28-May 2, 1991, No. 8-B-91, pp. 165 and 201.
Deng, Z., Breval, E. and Pantano, C. G., "Colloidal Sol/Gel Processing of Ultra-Low Expansion $TiO_2/SiO_2$ Glasses", J. Non-Crystalline Solids 100 (1988) pp. 364-370, North-Holland, Amsterdam.

Primary Examiner—W. Gary Jones
Assistant Examiner—John Hoffmann
Attorney, Agent, or Firm—Eugen E. Pacher

[57] ABSTRACT

Relatively large bodies of low-alkali silicate and other glass can be prepared conveniently by a particulate sol-gel process. The glass comprises at least 85 mole % $SiO_2$, 1-12 mole % oxide of one or more of Li, Na, K, Rb, Cs, Ti and Zr, 0-6 mole % of oxide of Al, and optionally at most 2.5 mole % of oxide of elements other than Si, Li, Na, K, Rb, Cs, Ti, Zr and Al. The process comprises forming particles from a first sol that comprises Si and one or more of Li, Na, K, Rb, Cs, Ti and Zr, and optionally additionally comprises Al. The process further comprises forming a second sol by dispersing the particles in an aqueous liquid, gelling the second sol, and heat treating the resulting gel body such that the glass results.

15 Claims, 1 Drawing Sheet

SOL-GEL METHOD OF MAKING MULTICOMPONENT GLASS

FIELD OF THE INVENTION

This invention pertains to methods of making multicomponent glass, especially silica-based multicomponent glass.

BACKGROUND OF THE INVENTION

Sol-gel methods make possible the preparation of very pure and homogeneous glasses of many compositions at relatively low temperatures. While almost any desired glass composition can be prepared by the alkoxide sol-gel process, it is at best very difficult to produce a relatively large glass body by the alkoxide process. For a review of multicomponent glasses made by the alkoxide processes see, for instance, E. M. Rabinovich, Journal of *Materials Science*, Vol. 20, pp. 4259–4280; see also I. M. Thomas, "Sol-Gel Technology for Thin Films, Fibers, Preforms, Electronics and Specialty Shapes", L. C. Klein, editor, Noyes Publications, pp. 1-15.

On the other hand, the particulate sol-gel process has made it possible to prepare quite large silica glass bodies, but it has not been possible to prepare other than at most lightly doped large silica bodies by the particulate process. For a review of the particulate process see, for instance E. M. Rabinovich, in "Sol-Gel Technology for Thin Films, Fibers, Preforms, Electronics, and Specialty Shapes", L. C. Klein, editor, Noyes Publications, 1988, pp. 260–294.

Starting at p. 274, the above cited publication also discusses a combined alkoxide-particulate method for making pure silica glass bodies. The method involves forming $SiO_2$ particles by hydrolyzing TEOS (tetraethyl orthosilicate) mixed with ethanol, forming a sol by re-dispersing the particles in water, gelling the sol, and drying and sintering the thus formed gel body. The author also speculates that it may be easier to dope alkoxides with foreign ions that it is to so dope fumed silica. See also U.S. Pat. No. 4,605,428, which also discloses a combined alkoxide-particulate method.

U.S. Pat. No. 4,666,247 discloses optical fiber that comprises, in addition to silica, a "modifier" chosen from a group of elements that comprises Li, Na, K, Rb, and Cs, and the rare earths, and a "homogenizer" chosen from a group of elements that comprises Al. The modifier- and homogenizer-containing glass is formed by vapor deposition.

In many areas of technology it would be highly desirable to have available relatively large silica-based glass bodies of compositions not readily made by conventional processes. Exemplary of such glass compositions are low-alkali silicate glasses. Such glasses are difficult to prepare by conventional melting due to their high melting temperatures and the attendant volatility of the alkali components. Small laboratory specimens of some low alkali binary glasses were prepared by the melt process as early as 1932, and some of their properties measured. See, for instance, G. W. Morey et al., *Journal of the Optical Society of America*, Vol. 22(11), p. 632. See also N. L. Laberge et al., *Journal of the American Ceramic Society*, Vol. 56(1), p. 506; and J. Schroeder et al., ibid, p. 510. However, due to the difficulty of preparation, low-alkali silicate glasses (typically no more than about 12 mole % alkali oxide) have not yet become commercial.

It has recently been discovered (see U.S. patent application Ser. No. 790,836, filed Nov. 12, 1991 for M. E. Lines) that some low-alkali silicate glasses can have very low Rayleigh scattering and thus are of interest for optical fiber applications. This application discloses a method that advantageously can be used to produce relatively large silica-based glass bodies, including low-alkali silicate glass bodies.

SUMMARY OF THE INVENTION

In a broad aspect the invention pertains to a relatively easy, convenient and economical process that can be used to make high-silica (i.e., at least 85 mole % $SiO_2$) glass compositions that are at best difficult to prepare by prior art methods, and involves the discovery that the particulate sol-gel process can lend itself to the production of these glass compositions. Exemplary of these compositions are those that contain about 1–12 mole % oxide of one or more metals selected from Li, Na, K, Rb, Cs, Ti and Zr. Optionally the compositions also comprise oxide of Al, typically no more than about 6 mole %. Glass according to the invention optionally comprises at most 2.5 mole % oxide of elements other than Si, Li, Na, K, Rb, Cs, Ti, Zr and Al.

More particularly, the invention is a method of making an article that comprises a quantity of high silica glass of the above-specified range of compositions. The method comprises forming silica-containing particles by a process that comprises forming and hydrolyzing a first sol that comprises alcohol and a Si-containing alkoxide, and forming a first gel or precipitate from the first sol. The method also comprises forming a second sol by a process that comprises dispersing at least some of the silica-containing particles in an appropriate liquid, typically water. The second sol is gelled, resulting in a gel body, and at least a portion of the gel body is heat treated such that the quantity of high-silica glass results.

Significantly, the first sol is formed such that the first sol further comprises one or more elements selected from Li, Na, K, Rb, Cs, Ti and Zr, and optionally additionally comprises Al, the amount of the element or elements and of the optional Al in the first sol selected such that the resulting high silica glass comprises 85–99 mole % $SiO_2$, 1–12 mole % oxide of said element or elements, 0–6 mole % oxide of Al, and optionally at most 2.5 mole % oxide of elements other than Si, Li, Na, K, Rb, Cs, Ti, Zr and Al. This last limit refers to the overall composition of the glass, locally the content of the "other" metal oxide (e.g., Ge-oxide, Er-oxide) can exceed the 2.5% level. By "locally" we mean "in a portion of the glass body", e.g., in the core region of an optical fiber preform. Al oxide (typically $Al_2O_3$) typically is present to prevent devitrification, especially in alkali-containing glass.

The thus produced glass body may be in final form, but more typically will be further processed to result in an article such as optical fiber, or a coating such as a planar glass waveguide on a Si substrate. Such processing can be conventional. Exemplarily, at least some of the glass compositions produced according to the invention have a thermal expansion coefficient that relatively closely matches that of Si, and/or have relatively low Rayleigh scattering.

There exist a variety of embodiments of the above described inventive process, and many of them are described below in terms of specific examples. All of them involve a heat treatment to transform the gel body (or a portion thereof) into substantially pore-free glass. This heat treatment can be conventional.

DETAILED DESCRIPTION OF SOME EXEMPLARY EMBODIMENTS

Figure 1:
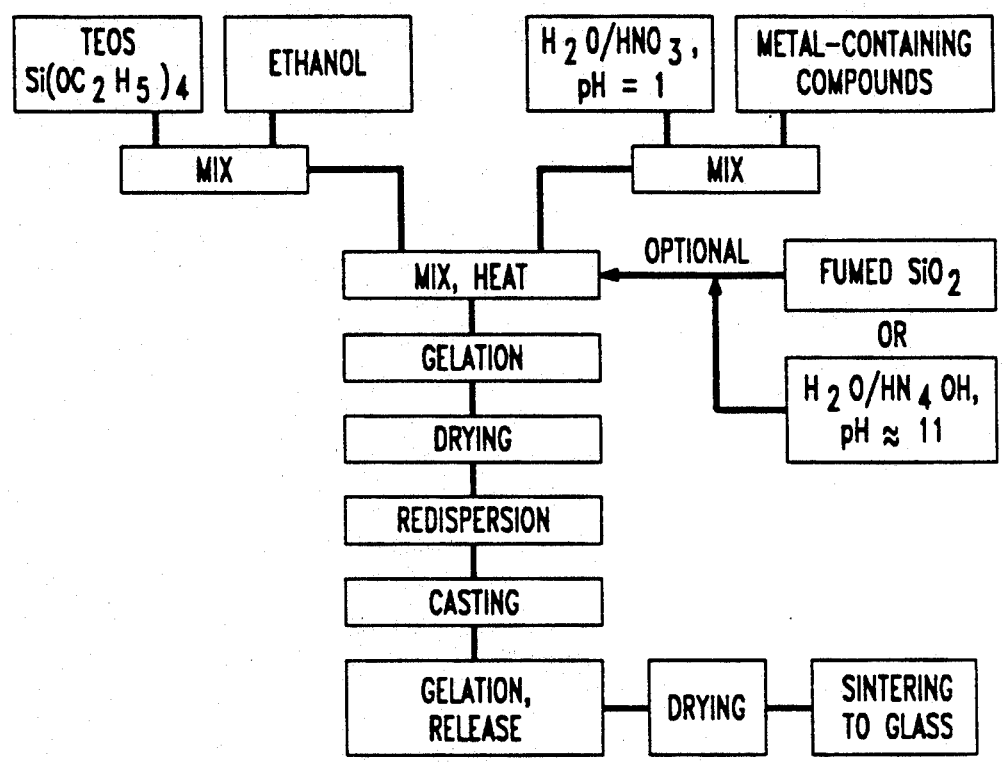
FIG. 1 shows, in form of a flow chart, major steps of an exemplary embodiment of the inventive process.

FIG. 1 depicts exemplary embodiments of the inventive process in flow chart form. A Si-alkoxide (typically, but not necessarily TEOS) is added to an appropriate alcohol (e.g., ethanol), and one or more metal-containing compounds (the metal selected from Li, Na, K, Rb, Cs, Ti and Zr; Al is optional but typically is present if the metal is an alkali metal) are added to an appropriate liquid (alcohol if the compound is an alkoxide, an aqueous medium if the compound is a soluble salt such as a nitrate, acetate, etc.). The liquids are mixed, water is added and the pH adjusted, all as necessary to result in the desired first sol. Optionally, colloidal silica particles are added to the liquid. We have found that a substantial portion of the $SiO_2$ in the final glass composition (exemplarily up to 85%) can be derived from pre-existing $SiO_2$ particles that are added to the first sol and/or the second sol. Advantageously the $SiO_2$ particles have BET surface area in the range 50–200 $m^2/g$. Such particles are commercially available.

The thus produced first sol is allowed to gel. Exemplarily this involves maintaining the sol at a slightly elevated temperature (e.g., 60° C.). After the first gel is formed from the first sol, the gel can be comminuted by mechanical means (e.g., forcing through a screen while still wet), followed by drying and, typically, further comminution. Alternatively, the pH of the first sol can be raised (e.g., by addition of ammonia water) such that the first gel is formed as particulate precipitate.

The thus produced (and typically dried) particles are then re-dispersed in an appropriate aqueous medium in known manner. Exemplarily, the sold:water weight ratio is about 10:17. At neutral pH the mixture may become too thick for conventional re-dispersion. Changing the pH to ~1 (by adding, $HNO_3$), or 11–12 (by adding, e.g., $NH_4OH$ or an organic base) can make the mixture flowable. However, for gelation, the pH typically should be reduced to about 9–10 by addition of an acid or an acid-forming compound.

The thus produced second sol is cast into an appropriate mold (e.g., a rod-in-tube mold), and allowed to gel. Frequently it is advantageous to evacuate the mold with the sol for several minutes. To accelerate gelation it may be advantageous to maintain the second sol at a slightly elevated temperature, e.g., 60°–70° C. High pH sols are advantageously cooled before addition of an acid to reduce the pH.

After gelation of the second sol, the resulting second gel body is removed from the mold, dried and sintered. This exemplarily involves drying for several days at room temperature (~25° C.), followed by drying in an oven while slowly heating from about 60° C. to about 150° C.

The subsequent heat treatment generally is conventional. Exemplarily it comprises slow heating in an oxygen-containing atmosphere to a temperature e.g., 700° C.) sufficient for removal of all organics from the porous body. It frequently also comprises a known dehydration treatment (e.g., several hours at 700° C. in $Cl_2$/He atmosphere), and optionally may comprise a known fluoridation treatment (e.g., several hours at 700° C. in $SiF_4$/He atmosphere). Alkali-containing porous bodies exemplarily are sintered at 1300° C. or below, and Ti- and/or Zr-containing bodies exemplarily are sintered above 1300° C.

Variations on the above described general procedure are possible. For instance, the first sol can be re-dispersed in hot oil and gelled therein, forming a fine powder which, after appropriate washing and drying, is used to form the second sol. In another variation, the second sol is not poured into a mold but instead is spread on a substrate, the resulting glass thus forming a layer on the substrate. In a still further variation the second gel body (or the porous body that results from drying the gel body) is contacted with an appropriate metal ion-containing liquid (e.g., a rare earth salt and/or an aluminum salt dissolved in water) such that a surface region of the porous body is impregnated with the ions, resulting in a glass body (e.g., an optical fiber preform) that has a non-uniform concentration of the metal ions. Those skilled in the art will appreciate that, if a glass with a uniform distribution of, e.g., rare earth oxide, is desired, an appropriate rare earth containing compound can be incorporated in the first sol. In another variation of the process, the appropriate steps are repeated, such that a compound glass body, of non-uniform chemical composition, results.

The examples that are provided below illustrate the basic process and many of the possible variations. Those skilled in the art will readily be able to adapt the recited exemplary conditions to their particular requirements.

EXAMPLE 1

An exemplary low alkali silica glass was made as follows. 14.07 g $KNO_3$ and 31.96 g Al $(NO_3)_3.9H_2O$ were dissolved in 304 g of dilute $HNO_3$ (pH ~ 1). To this was added a solution consisting of 216.65 g TEOS and 235.9 g ethanol, and mixed for 30 minutes, resulting in the "first" sol. The first sol was allowed to gel at 60° C. for 24 hours, substantially without evaporation. The resulting dense wet first gel was mechanically broken into a fine powder by conventional means, and dried at a temperature in the range 60°–150° C., namely, at about 100° C.

The thus produced powder was redispersed in water to form the "second" sol. The pH of the water was adjusted to be in the range 3–4 by addition of an acid additive, namely, $HNO_3$. The proportion was 50 g of solid to 90 g of liquid. Redispersion involved attrition for 24 hours in glass jars with fused silica cylinders as milling medium. Those skilled in the art will appreciate that other techniques (e.g., employing a blender or a high-speed mixer) can alternatively be used. The resulting sol was cast in molds made of glass tubing and rubber stoppers, and allowed to gel at about 25° C. Gelation was substantially complete after about 3–4 hours.

The resulting gel rods were removed from the molds, dried and sintered at a temperature in the range 1250°–1300° C. (namely, at 1275° C.) to transparent glass. This involved heating the bodies from room temperature to 500° C. in an oxygen-containing atmosphere (air) to remove organic residues, heating to 700° C. in flowing He, soaking at that temperature for 4 hours (2 hours in 1 l/min He+100 cc/min $Cl_2$; 2 hours in flowing He), raising the temperature at 100° C./hr to 1275° C. (flowing He), sintering for 1 hour in He, followed by furnace cooling to room temperature. Those skilled in the art will appreciate that the described heat treatment is exemplary only, and that, for instance, appropriate steps can be added or left out. As an example, chlorine treatment can be dispensed with if dehydration is not required, and a gel body can be exposed to, e.g., $SiF_4$ if incorporation of F into the glass is desired.

Exemplary of the thus produced glass bodies was a glass rod of 12 cm length and 1.5 cm diameter, having composition 92 mole % $SiO_2$, 5 mole % $K_2O$ and 3 mole % $Al_2O_3$. The glass was essentially pore-free, with refractive index 1.46, and a linear coefficient of thermal expansion $14 \times 10^{-7}$/°C. in the temperature range 50°–500° C.

EXAMPLE 2

A glass body is made substantially as described in Example 1, except that the first sol is redispersed in hot oil (e.g., 93% mineral oil Amoco White ®, 21 USP) with a commercially available high speed mixer, and gelled in droplets to form a fine powder, substantially as described by A. G. Mateos et al., 93rd Annual Meeting Abstracts, American Ceramic Society, Cincinnati, Ohio, Apr. 28–May 2, 1991, No. 8-B-91, pp. 165 and 201. After precipitation of the droplets, the oil is removed by washing with acetone, and the powder is dried. The thus produced powder is used to make the second sol.

EXAMPLE 3

A glass body was made substantially as described in Ex. 1, except that, after maintaining the first sol at 60° C. for 2 hours, ammonia water (pH ~ 11) was added to the sol to raise the pH above 9 and to cause precipitation of a multicomponent powder. After drying, the powder was used to form the second sol.

EXAMPLE 4

A glass body is prepared substantially as described in Example 3, except that the first sol is precipitated in oil, substantially as described in Example 2.

EXAMPLE 5

Glass bodies were made substantially as described in Examples 1 and 3, respectively, except that the amount of TEOS was reduced, and commercially available fumed silica was added to the first sol in an appropriate amount to result in the desired silica content (e.g., 92 mole %). We have found that, exemplarily, 20-85 weight % of the silica can readily be supplied by addition of fumed silica. Exemplarily, the fumed silica has BET surface area of about 50 or 200 $m^2/g$, or is a mixture thereof.

EXAMPLE 6

Glass bodies were made substantially as described in Example 1, except that Li, Na, Rb and Cs nitrates, respectively, were used to provide the alkali ions.

EXAMPLE 7

Glass bodies are made substantially as described in Example 1, except that Li, K, Na, Rb and Cs acetates, respectively, are used to provide the alkali ions.

EXAMPLE 8

A glass body was made substantially as described in Example 1, except that the first sol was prepared using Al-isopropoxide and K-ethoxide, pre-dissolved in their respective parent alcohols, rather than using nitrates dissolved in an aqueous medium.

EXAMPLE 9

Glass bodies are prepared substantially as described in Example 1, except that Er-nitrate and Nd nitrate, respectively, were also added to the aqueous solution, in an amount sufficient to yield glass bodies that contain 1.5 mole % of the oxides of the respective rare earth ions. Rare earths are the elements of atomic number 57–71 and Y.

EXAMPLE 10

Figure 2:
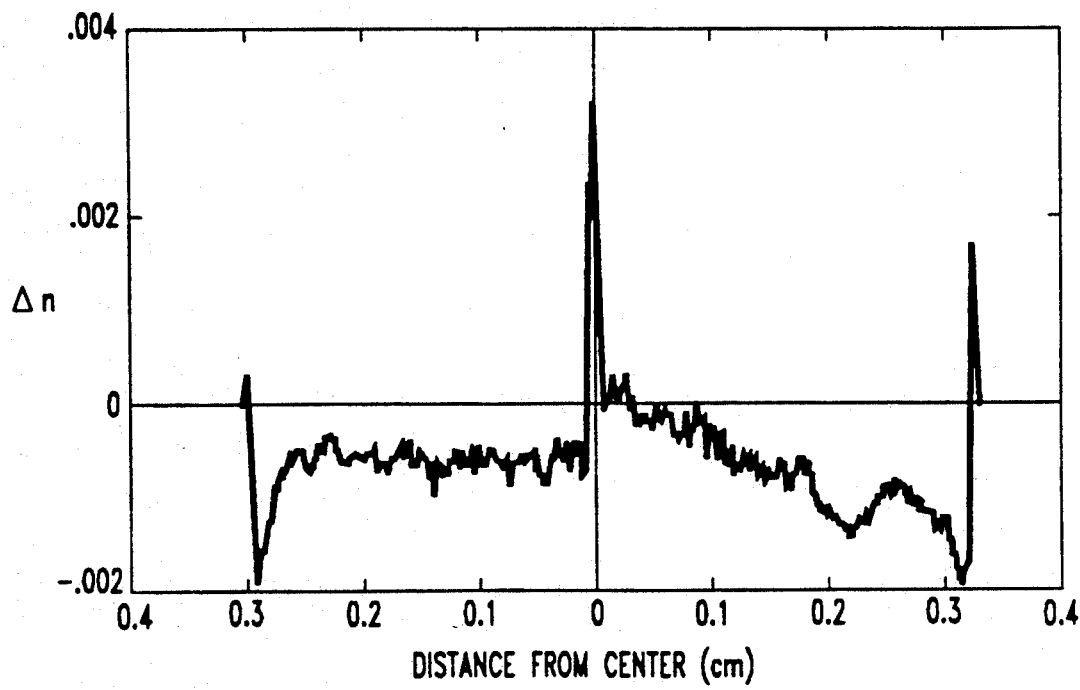
FIG. 2 shows data on the refractive index profile of an exemplary fiber preform made according to the invention.

A second sol was prepared substantially as described in Example 1, except that the mold was a rod-in-tube mold. After gelation the central molding rod was removed, and the inside of the gel tube was contacted with an aqueous solution of Al-nitrate and Er-nitrate. The concentration of Al was 50% higher than in Example 1, so as to result in increased $Al_2O_3$ content and refractive index of the impregnated layer. The Er concentration was sufficient to result in 0.5 mole % of $Er_2O_3$ in the impregnated region. After 30 minutes the remaining solution was poured out, the gel tube was removed from the mold and allowed to dry. After sintering the tube substantially as described, the glass tube was collapsed to form an optical fiber preform. The refractive index profile of the thus produced preform is shown in FIG. 2.

EXAMPLE 1

A gel tube is prepared substantially as described in Example 10. A "third" sol is prepared substantially in the same manner as the second sol of Example 1, except that the composition is selected such that the refractive index of the glass that derives from the third sol is about 0.2% higher than that of the glass that derives from the gel tube. The third sol is poured into the gel tube and allowed to gel. The resulting gel rod is released from the mold, and dried and sintered substantially as described. Optical fiber is drawn from the thus produced preform.

EXAMPLE 12

A second sol, prepared substantially as described in Example 1, is deposited on a silicon wafer by dipping. After gelation and drying, the thus formed layer is fired to transparency at 1275° C. by a conventional process. A further glass layer is formed on the previously formed layer substantially as described, except that the composition is adjusted so as to result in glass of slightly higher (~0.3%) refractive index. The thus produced 2-layer glass body is then conventionally processed to yield a planar optical waveguide on the Si wafer. The thermal expansion coefficient of the waveguide material is substantially equal to that of Si.

EXAMPLE 13

A glass body was made substantially as described in Example 1, except that Ti-alkoxide (Ti-isopropoxide) was substituted for potassium and aluminum nitrate. Other differences will be pointed out or will be apparent to those skilled in the art. The TEOS and Ti-alkoxide were mixed and hydrolized in the presence of water and alcohol at low pH. When the first signs of gelation were observed, ammonia water was added to the first sol to raise the pH and provoke powder precipitation. A second gel body was formed as previously described, and transformed into a glass body by a heat treatment substantially as described, except that the sintering temperature was in the range 1300°–1500° C. (exemplarily 1450° C.). The thus produced glass body had composition 90 weight % $SiO_2$, 10 weight % $TiO_2$, and had slightly negative thermal expansion. An appropriately modified heat treatment can produce a strong crystalline material that is akin to glass-ceramics and has small positive thermal expansion.

EXAMPLE 14

A glass body is produced substantially as described in Example 13, except that a Zr-alkoxide (e.g., Zr-isopropoxide) is substituted for the Ti-alkoxide.

We claim:
1. Method of making an article that comprises a quantity of high silica glass, the method comprising
   a) forming silica-containing particles by a process that comprises forming and hydrolyzing a first sol that comprises alcohol and a silicon-containing alkoxide;
   b) forming a silica-containing second sol by a process that comprises dispersing said particles in an aqueous liquid;
   c) gelling the second sol to form a silica-containing second gel, and drying the second gel such that a porous material results; and
   d) heat treating said porous material such that the quantity of silica-containing glass is produced from the porous material;

CHARACTERIZED IN THAT
   step a) comprises forming the first sol such that it further comprises one or more elements selected from Li, Na, K, Rb, Cs, Ti and Zr, and optionally additionally comprises Al, the amount of the element or elements and of the optional Al in the first sol selected such that the resulting high silica glass comprises 85–99 mole % $SiO_2$, 1–12 mole % oxide of said element or elements, 0–6 mole % Al oxide, and optionally at most 2.5 mole % of oxide of elements other than Si, Li, Na, K, Rb, Cs, Ti, Zr and Al.

2. Method of claim 1, wherein step a) comprises dissolving an alkoxide of one of said elements in alcohol.

3. Method of claim 1, wherein step a) comprises dissolving a compound of one of said elements in an aqueous liquid.

4. Method of claim 3, wherein said compound is a nitrate or an acetate, and the aqueous medium is acidified water.

5. Method of claim 3, wherein said compound is a nitrate or an acetate, and the aqueous medium is water with a base additive.

6. Method of claim 1, wherein the first sol comprises pre-existing silica particles.

7. Method of claim 6, wherein the pre-existing silica particles comprise fumed silica having BET surface area in the range 50–200 $m^2/g$, and the pre-existing particles are added in an amount sufficient to provide 20–85 weight % of the silica in the resulting high silica glass.

8. Method of claim 1, comprising dispersing the first sol in oil such that said silica-containing particles are formed, and further comprising removing the oil from said silica-containing particles prior to step b).

9. Method of claim 1, wherein the first sol comprises at least one of Li, Na, K, Rb and Cs, and further comprises Al, and wherein step d) comprises sintering the porous material at a temperature of at most about 1300° C.

10. Method of claim 9, further comprising contacting, prior to sintering, the silica-containing second gel or the porous material with a rare earth-containing liquid.

11. Method of claim 10, wherein the gel body is a tubular body having an inner tube surface, the method comprises contacting at least a portion of the inner tube surface with the rare earth-containing liquid, and the method further comprises forming a solid glass rod from the tubular body, and drawing optical fiber from the glass rod.

12. Method of claim 9, wherein step a) further comprises dissolving a rare earth compound in an aqueous liquid, the amount of rare earth compound selected such that the resulting high silica glass contains less than 2.5 mole % rare earth oxide.

13. Method of claim 1, wherein the first sol is substantially Al-free and comprises at least one of Ti and Zr, and wherein step d) comprises sintering the porous material at a temperature in the range 1300°–1500° C.

14. Method of claim 1, wherein step c) comprises gelling the second sol in a mold such that a tubular gel body results, the body having a bore, and wherein the method further comprises
   i) forming a third sol of composition selected such that the third sol yields glass that has a refractive index that is higher than that of the high silica glass that results from the second sol; and
   ii) at least partially filling the bore of the tubular gel body with the third sol, and gelling the third sol such that a rod-like composite gel body results; and
   steps c) and d) comprise drying the composite gel body such that a composite porous body results, and heat treating the composite porous body such that a rod-like glass body results.

15. Method of claim 14, further comprising drawing optical fiber from the rod-like glass body.

* * * * *